United States Patent [19]

Delmas

[11] 4,338,722
[45] Jul. 13, 1982

[54] OPTOELECTRONIC DISPLACEMENT SENSOR

[75] Inventor: Jean R. Delmas, Vanves, France

[73] Assignee: Microlec, S.A., Fribourg, Switzerland

[21] Appl. No.: 195,009

[22] PCT Filed: Oct. 15, 1979

[86] PCT No.: PCT/FR79/00093
§ 371 Date: Jun. 16, 1980
§ 102(e) Date: Jun. 16, 1980

[87] PCT Pub. No.: WO80/00873
PCT Pub. Date: May 1, 1980

[51] Int. Cl.³ ............................................. G01B 11/24
[52] U.S. Cl. ................................ 33/174 L; 33/169 R; 33/172 E; 250/231 P
[58] Field of Search ............. 33/174 L, 169 R, 172 E, 33/174 Q, 174 P, 125 A, 125 C; 250/231 P, 237 G; 356/397, 376

[56] References Cited

U.S. PATENT DOCUMENTS

| | | | |
|---|---|---|---|
| 3,590,261 | 6/1971 | Snook | 250/231 R |
| 3,624,913 | 12/1971 | Ciamporini | 33/174 Q |
| 3,898,454 | 8/1975 | Friday et al. | 250/231 P |
| 4,120,093 | 10/1978 | Spies | 33/174 L |

Primary Examiner—Willis Little
Attorney, Agent, or Firm—Lowe, King, Price & Becker

[57] ABSTRACT

Displacements of a moving stem are measured by an optoelectronic high precision dimension and displacement measuring sensor. The stem slides in a body on two guides carried by the body. Two adjacent photoreceivers symmetrically positioned on either side of the stem axis are responsive to an optical source. A cover carried by the moving stem is situated between the source and the photoreceivers. The cover includes transparent and opaque parts so the cover movement increases and decreases the areas of the two photoreceivers exposed to the light source. The cover is substantially symmetrical with the contact tip at the stem end relative to the center point between the two guides, whereby mechanical play of the stem in the guides causes the illumination of the photoreceivers to be virtually the same.

8 Claims, 11 Drawing Figures

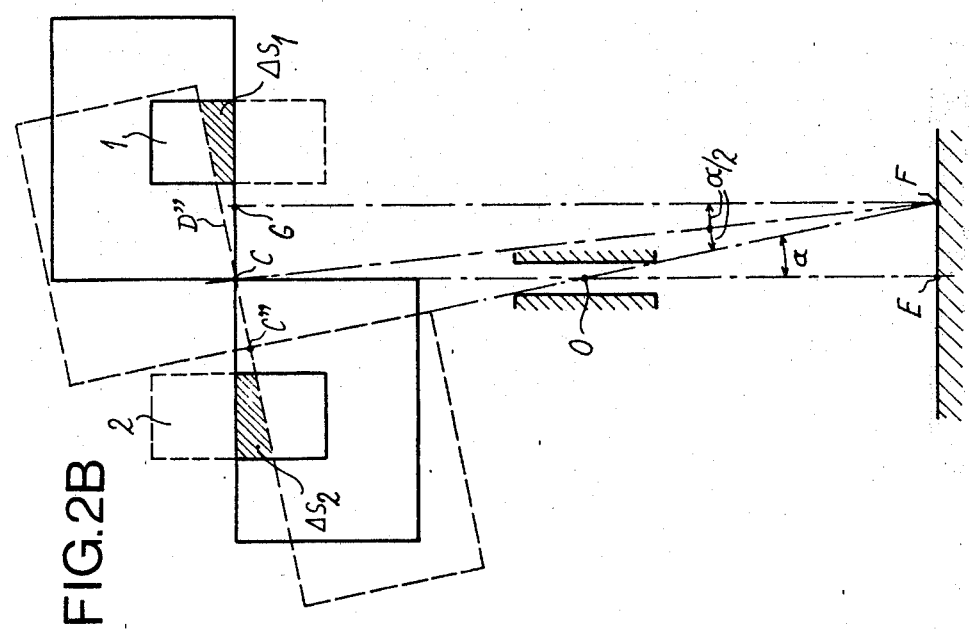
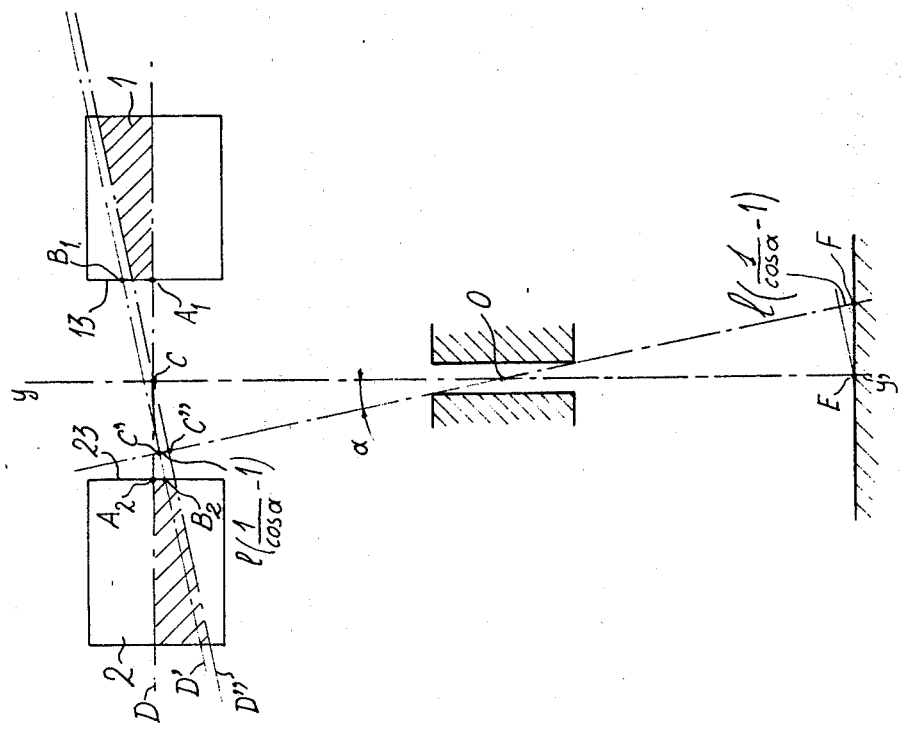
FIG.2A
FIG.2B

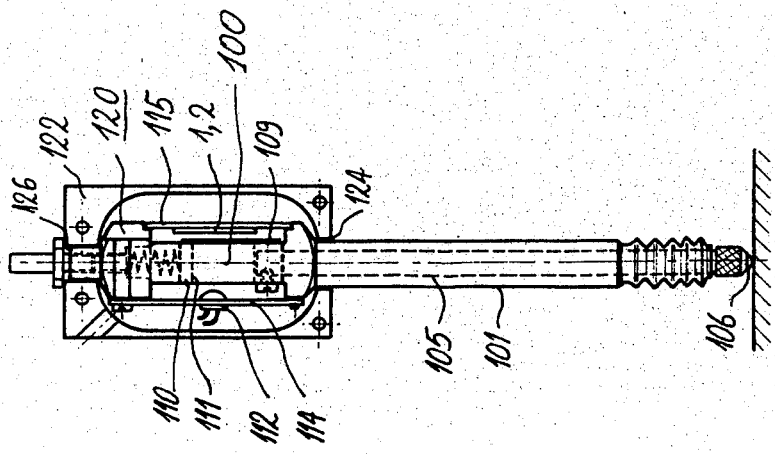
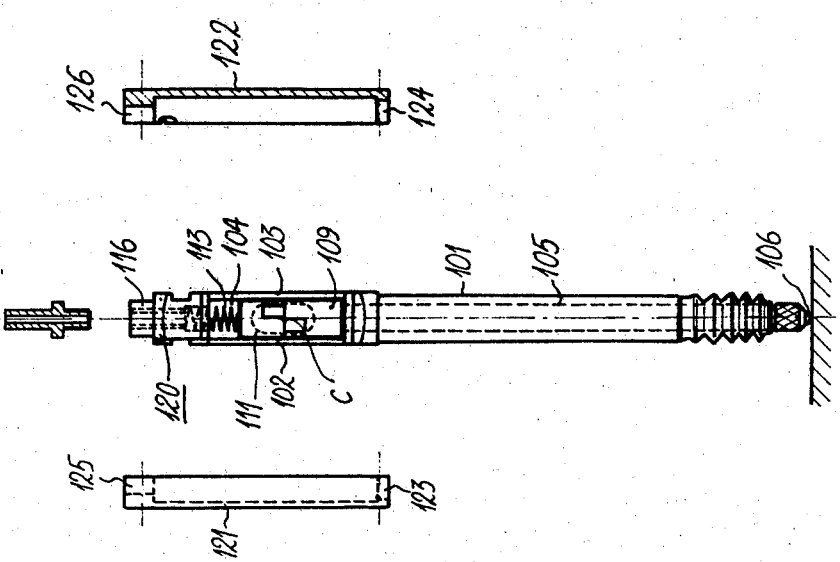

OPTOELECTRONIC DISPLACEMENT SENSOR

BACKGROUND OF THE INVENTION

1. Field of the Invention

The present invention relates to an optoelectronic high-precision displacement sensor and more especially a sensor of this type using differential action photoreceivers.

2. Description of the Prior Art

Optoelectronic sensors employing differential photoreceivers for measuring machining tolerances and for measuring displacements are known.

In U.S. Patent application Ser. No. 937,688 of Aug. 28th, 1978 in the name of the present applicant there is described a device for detecting whether a measured dimension deviates or does not deviate from a nominal value by a predetermined increment. This device comprises a feeler probe for following the surface of a mechanical component, a variable surface window having an area controlled by the feeler probe, two pairs of photoelectric receivers and an electronic circuit including three flip-flops. The receivers of each pair detect differential illumination projected by a light source through the window. The first flip-flop is activated when the differential illumination from a certain pair of photoreceivers exceeds a positive predetermined value; the second flip-flop is activated when the differential illumination from a second pair of photoreceivers exceeds a negative predetermined value and the third flip-flop is activated when neither the first nor the second flip-flops is activated, which implies that the dimension tested lies within the nominal limits.

Such a device is designed for measuring tolerances, but not dimensions, with the high level of accuracy required.

Optoelectronic dimension or displacement measuring devices are described in French Pat. No. 2,300,367 of Feb. 7th, 1975 and in French Rider Pat. No. 2,340,574 of July 26th, 1976 both in the name of the current applicant. In these patents, a pair of photoreceivers have a sensitive surface with a square or rectangular contour (formed, in the specific embodiments by a fixed cover in the event photoreceivers include a round focusing lens). The photoreceivers are connected in series by having a common electrode between two electrical supply lines. The measurement of a voltage variation at the common electrode due to a displacement of a movable cover linked to the stem of a probe, which partially masks each photoreceiver, is indicated by an electrical or digital display indicator.

Such a system can be used for dimensional measurements. In this case, light sources are associated with each of the two photoreceivers. The photoreceivers are separated from each other by being located on one and the same side with respect to the moving probe system and on either side of a mask. The mask is a bar linked to the moving stem. The mask partially covers each of the photoreceivers to intercept the light emitted by the sources in such a manner that when the illumination of one photoreceiver decreases, that of the other increases.

This prior art arrangement is relatively bulky because the two photoreceivers are: (1) spaced relative to each other and, (2) relatively distant from the moving stem. These factors lead to the use of two separated light sources, one per photoreceiver. The same brightness must, therefore, be derived from the two sources, which is difficult.

Furthermore, this prior art arrangement does not make it possible to reach a high degree of accuracy, of approximately 0.1 μm for a dimension of 1 mm which the device of the present invention permits. Inevitable sideward mechanical play in the probe stem in guide sleeves thereof leads to unequal variations in the amount of light received by the photoreceivers. The differences of these variations do not exactly cancel when the signals resulting from the differential illumination from photoreceivers are subtracted.

SUMMARY OF THE INVENTION

The optoelectronic high precision dimension and displacement measuring sensor of the invention comprises a body and a moving stem having displacements to be measured. The stem slides in the body on two guides incorporated in the body. A contact tip is at an end of the stem. A light source and two adjacent photoreceivers are symmetrically positioned on opposite sides of a stem axis. A cover carried by the moving stem has transparent and opaque parts. The cover is situated between the source and the photoreceivers whereby movement of the cover in first and second directions has the effect of respectively increasing and reducing the areas of the sensitive surfaces exposed to the light source of the two photoreceivers. The cover is substantially symmetrical with the contact tip of the stem relative to a center point between the two guides. Two parallel plates are disposed in the body forming a slideway. The plates are at an end of moving stem other than the contact tip. A slide block, carrying the moving cover and sliding in the slideway, has an oblong transparent portion allowing light to pass from the light source to the photoreceivers.

BRIEF DESCRIPTION OF THE DRAWINGS

The invention is now to be described in detail in relation to the diagrams in appendix hereto where:

FIGS. 2A and 2B are explanatory diagrams showing how the respective lay-out of the photoreceivers and the cover make it possible to avoid any measuring error stemming from the lateral mechanical play in the moving stem;

FIGS. 4 and 5 are respectively a side-view of the sensor with the two halves of the box separated and a front-view of the sensor where one of the box halves is still in place;

DESCRIPTION OF THE PREFERRED EMBODIMENT

Figure 1A:
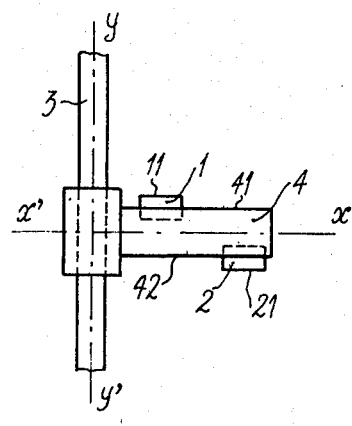
FIGS. 1A, 1B and 1C are explanatory diagrams of the error introduced in a dimensional measurement made with equipment based on former techniques in the case where the probe stem is inclined at an angle.
Figure 1B:
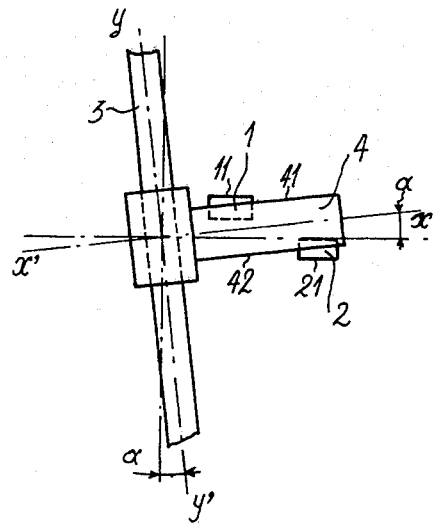

In FIGS. 1A and 1B, are illustrated probe stem 3 having an axis y—y', moving cover 4 having an axis x—x' at right angles to axis y—y' and displaced photoreceivers 1 and 2. In FIG. 1A, stem 3 is illustrated in the normal position thereof, whereby sides 41 and 42 of cover 4 are parallel to sides 11 and 21 of photoreceivers 1 and 2. In FIG. 1B, probe stem 3 is illustrated as inclined at an angle α to its normal position, whereby sides 41 and 42 of cover 4 are inclined at an angle α to sides 11 and 21 of photoreceivers 1 and 2.

Figure 1C:
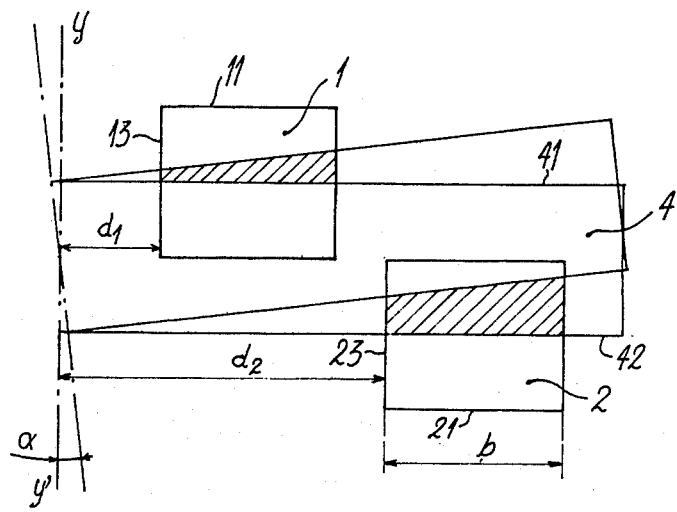

By letting $d_1$ and $d_2$ be the distances between axis y—y' and the sides of photoreceivers 1 and 2 adjacent axis y—y' and b the width of the photoreceivers (FIG. 1C), and assuming cover 4 is angularly displaced from axis x—x' by α, the shaded areas blanked off from photoreceiver 1 and uncovered on photoreceiver 2 respectively are, to a first approximation:

$$\left(d_1 + \frac{b}{2}\right) b \tan\alpha \text{ and } \left(d_2 + \frac{b}{2}\right) b\alpha\tan$$

Because side 13 is closer to axis y—y' than side 23, $d_1 \neq d_2$, whereby the surface areas are not equal. Consequently, the voltage of photoreceivers 1 and 2 partly depends on the lateral mechanical play in the moving step, which can lead to a measurement error.

In the application, the photoreceivers are situated on opposite sides of stem axis y—y', while always being very close together.

Let 0 be the centre of rotation about which stem 3 turns as a result of stem play in guides thereof; point 0 is the point of the stem axis equidistant from the guides; and let C be the point where the axis of symmetry (D) of mask 4 that is perpendicular to the stem axis cuts the stem axis. The distance 0C is given as l.

Sides 13 and 23 of photoreceivers 1 and 2 are at the same distance d from the axis y—y' of the stem, on opposite sides of the stem. By forming two rectangular axes passing through 0 as the coordinate axes where axis 0y is along the stem axis, then axis of symmetry D of the cover has the equation:

$$y = l$$

and cuts sides $x = \pm d$ at two points, $A_1$ (d,l) and $A_2$ (−d,l).

If the axis of stem 3 is inclined at angle α, point C undergoes rotation and moves from point C (0,l) to point C' (−l sin α, l cos α). Axis of symmetry D' of the mask is then represented by the equation:

$$-\frac{x}{l} \sin\alpha + \frac{y}{l} \cos\alpha - 1 = 0 \quad (1)$$

This line does not pass through C and cuts lines $x = \pm d$ at $B_1$, but $B_2$ with respective coordinates of:

$$x_{B1} = +d \qquad x_{B2} = -d$$

$$y_{B1} = \frac{l}{\cos\alpha} + d\, tg\alpha \qquad y_{B2} = \frac{l}{\cos\alpha} - d\, tg\alpha$$

Points $B_1$ and $B_2$ are not symmetrical with respect to C and segments $A_1$, $B_1$ and $A_2$, $B_2$ are not equal.

From FIG. 2A, when the axis of stem 3 is at an oblique angle α, the stem touches the component at point F and not at point E. Stem 3 therefore slips by the quantity $$l\left(\frac{1}{\cos\alpha} - 1\right).$$

Straight line D' moves to D" such that the separation C'C" is given by $$l\left(\frac{1}{\cos\alpha} - 1\right).$$

The equation for D" is given by:

$$\frac{x}{p} + \frac{y}{q} - 1 = -\frac{x \sin\alpha \cos\alpha}{(2\cos\alpha - 1)} + \frac{y \cos^2\alpha}{(2\cos\alpha - 1)} - 1 = 0 \quad (2)$$

whence $$p = -\frac{l(2\cos\alpha - 1)}{\sin\alpha \cos\alpha} \qquad q = \frac{l(2\cos\alpha - 1)}{\cos^2\alpha}$$

and the distance from 0 to straight line D" axis y—y" is:

$$\delta = p \sin\alpha = q \cos\alpha = \frac{l(2\cos\alpha - 1)}{\cos\alpha}$$

which tends to l as α tends to zero.

The straight line passes through point C, the center of symmetry of photoreceivers 1 and 2 mark off on each of the photoreceivers equal increment and decrement surfaces. If α is taken to by infinitely small of the first order, (δ−l) is infinitely small in $\alpha^2$. If the center of symmetry C of the photoreceivers is the point of symmetrical of contact with respect to 0 that is equidistant from the two guide sleeves of the two slides, an inclination of stem 3 due to the play thereof has no effect on the accuracy of the measurement.

FIG. 2B is a drawing enabling a geometrical explanation to be given of the conditions to be satisfied for an inclination of the sensor differential moving stem (resulting from mechanical play) to have no effect on the in illumination of two photoreceivers.

Let C be the centre of symmetry of the two photoreceivers assemblies.

In the middle position of the moving cover associated with the moving stem perpendicular to the surface to be checked, masking line D passes through C.

An inclination angle α of the moving stem relative to point 0, at the middle of the overall length of the guiding sleeves, can generate a non-zero difference between resulting variations $\Delta S_1$ and $\Delta S_2$ of the illuminated surfaces, if new position D' of the masking line does not pass exactly through point C.

For variations $\Delta S_1$ and $\Delta S_2$ to be equal, the condition

CC"=CG must be fulfilled, where CC" and CG are perpendicular to C"F and CE respectively.

Point C must, therefore, lie on the line bisecting the angle

equal to the angle of inclination α of the moving stem.

$C'C = OC \sin\alpha$, $CG = EF = EC \tan\alpha/2$, $CC'' = CG$.

-continued $$\frac{OC}{EC} = \frac{\tan\alpha/2}{\sin\alpha}$$

when $\alpha$ is small;  $\frac{OC}{EC} = \frac{\tan\alpha/2}{\sin\alpha} \simeq \frac{1}{2}$ Point C is, consequently, symmetric to point E relative to point 0.

FIGS. 4 and 5 are diagrams of an optoelectronic displacement sensor in accordance with the invention.

The sensor of FIGS. 4 and 5 comprises a body having a cylindrical tube lower part 101 which enables the sensor to be fixed on a holder, not shown, and an upper part 120 formed of two parallel plates 102 and 103 forming a housing 104 with two opposite planar faces. A moving stem 105 with a contact tip 106 slidably guided inside cylindrical body 101 sleeves 107 and 108. As per the explanations given in relation to FIGS. 2A and 2B, the center of container 104 is substantially symmetrical with tip 106 with respect to the point equidistant from sleeves 107 and 108. A tubular part 116 makes it possible, by applying a vacuum, to lift moving stem 105. In housing 104 are: cover 109 that moves in the plane of FIG. 4 perpendicular to the plane of FIG. 5; cover 109 is, for example, formed of a light opaque photographic plate or metal parts corresponding to the drawing in FIGS. 3A and 3B; moving cover holder 110 with an opening 111 of sufficient size for light source 112 to illuminate photoreceivers 1 and 2 through the transparent parts of the cover.

Holder 110 is attached to the end piece of moving stem 105 inside of housing 104. Holder 110 has a parallelepiped exterior shape having faces perpendicular to the plane of FIG. 4 in sliding contact, by a film of grease, with two planar and parallel walls 102, 103 of hollow 104; this construction precludes rotation of moving cover 109 about axis y—y' of moving stem; (it would suffice if only one face of holder 110 contacted one of walls 102 and 103).

One side of compression spring 113, which holds contact tip 106 down on the surface to be checked pushes against body 120; the other side of spring 113 bears against holder 110 of the moving cover.

Support plate 114, perpendicular to the plane of FIG. 5, includes light source 112 and a hybrid type associated electrical supply circuit. Source 112 is a light emitting diode or an incandescent lamp.

Support plate 115, perpendicular to the plane of FIG. 5 of the receiver electronics assembly includes, the two photoreceivers 1 and 2 having sensitive surfaces marked off by a square or rectangular shaped contour. Photoreceivers 1 and 2 are positioned very close to each other, the lower limit of the interval separating them being of the order of a tenth of a millimeter. The receiver electronics assembly also includes the various electronic components of the hybrid circuit necessary for the data processing. The photoreceivers can be photodiodes or phototransistors.

The sensor is located between two half-shells 121 and 122 having a hollow parallelepiped shape, within ovoid hollow. The edges of these shells have two semi-cylindrical grooves, such that grooves 123 and 125 are provided for half-shells 121, and grooves 124 and 126 are provided for half-shell 122. Grooves 123 and 124 of a relatively large diameter envelop cylindrical body 101 and grooves 125 and 126 of a smaller diameter envelop tubular outlet 116.

The inside of the box created by half-shells 121 and 122, together with part 120 of body 100, form a passage for the electrical wires connecting the emitter-receiver circuits and a separate unit (not shown) capable of being used with one or several sensors.

To use the sensor of the invention, the separate unit contains:

a low voltage d.c. regulated electrical supply required for the transmitter and receiver circuits to work; and either a needle or a digital display electrical indicator that indicates the exact value of the movement of stem 105 of one sensor amongst "n". Such a result is obtained with a switching unit, or a switching device making it possible to transmit the data from one sensor amongst "n" to an electromechanical displacement control system or for stops of moving bodies using predetermined positions of said sensor moving stem.

Figure 6:
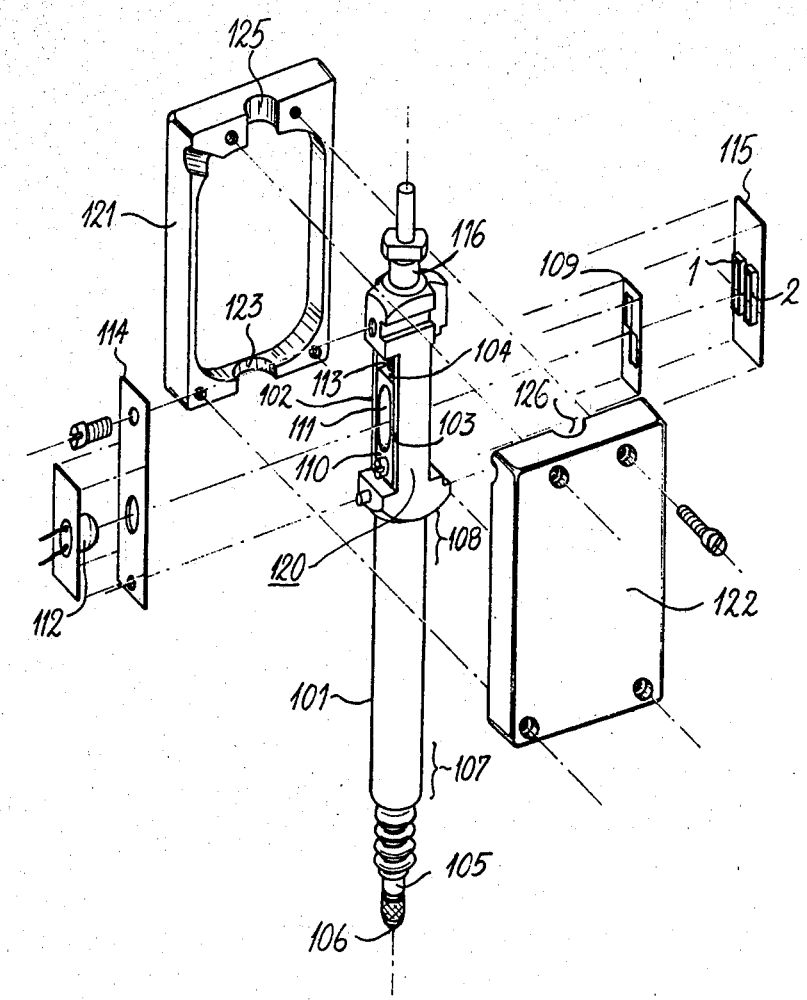
FIG. 6 is an exploded view of the sensor in the invention.

FIG. 6 is an exploded perspective view of the sensor. Bodies 101–102, half-shells 121 and 122, source holder 114 and photoreceiver holder 115 are illustrated. The reference numbers for the components on FIG. 6 are the same as those of FIGS. 4 and 5.

Figure 3A:
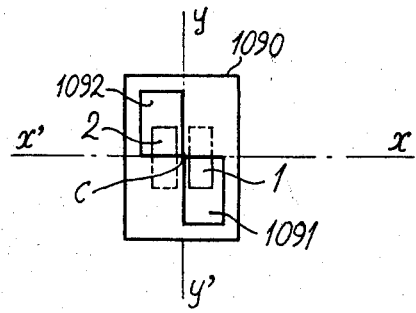
FIGS. 3A and 3B are front views of the cover and the respective lay-out of the photoreceivers and the cover, with particular emphasis on the shapes of these parts.
Figure 3B:
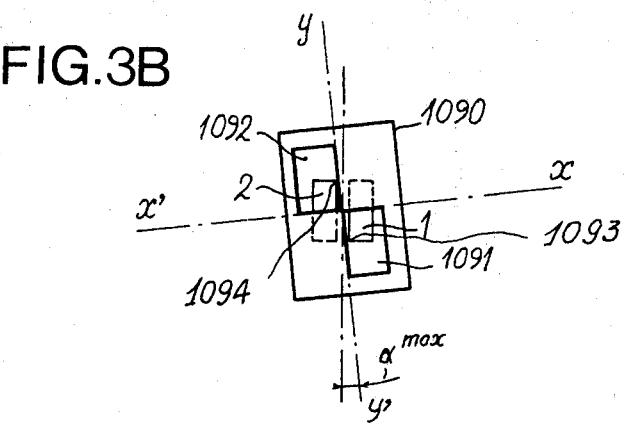

Cover 109, is of the type shown in FIGS. 3A and 3B, comprises a plate 1090 perforated by two rectangular windows 1091 and 1092, joined together at vertex C, and having aligned sides. From FIG. 3B, the stem axis can assume a maximum inclination angle $\alpha_{max}$ wherein vertex 1093 of photoreceiver 1 is on the inner vertical side of window 1091 and a vertex 1094 of photoreceiver 2 is on the same vertical side.

Figure 7:
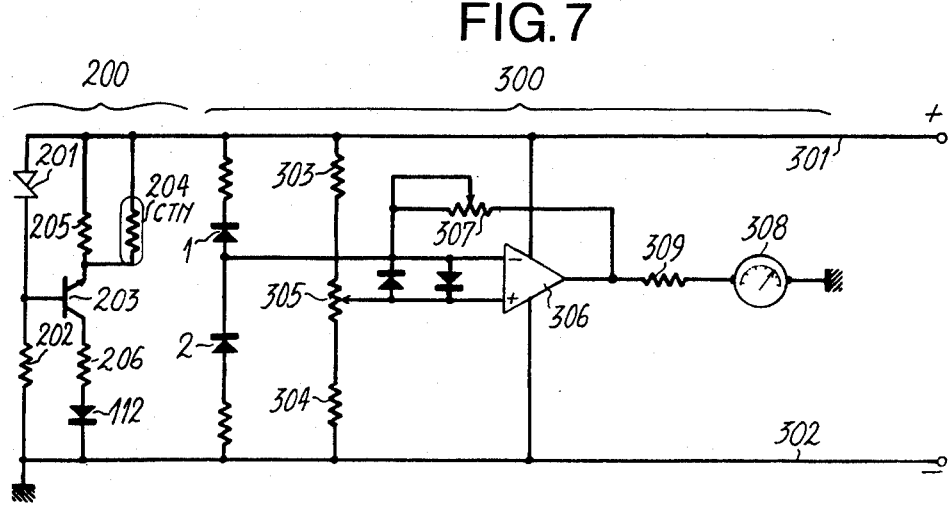
FIG. 7 is a wiring diagram of sensor's amplifier.

As illustrated in FIG. 7, the electronic assembly incorporated in the sensor, includes emitter circuit 200 and receiver circuit 300 of known types.

Emitter circuit 200, powered by outside regulated low voltage supply, not shown, includes a Zener diode 201 in series with a resistor 202. The point common to diode 201 and to resistor 202 is connected to the base of a transistor 203. The parallel combination of negative temperature coefficient (NTC) resistor 204 and a resistor 205 are connected to the transistor emitter circuit; the collector circuit is connected to the series combination of light emitting diode 112 and resistor 206. Circuit 200 is temperature compensated by negative temperature coefficient resistor 204, the compensation being such that the temperature can vary from 0° to 50° C. without introducing any temperature drift in receiver 300.

Receiver circuit 300, powered by the same outside regulated low voltage supply, includes the following main components between two electrical supply lines 301 and 302:

photoreceivers 1 and 2;

an assembly formed of fixed resistors 303 and 304 and a potentiometer 305;

an amplifier 306 having a negative input connected to the common electrode of photoreceivers 1 and 2 and a positive input connected to the adjustable point of potentiometer 305.

The receiver circuit output can be connected externally either to: an electrical indicator 308 via grounded resistor 309, making it possible to read displacement values for the sensor's moving stem; or the aforementioned electronic switching assembly enabling the displacements and stops of moving bodies to be controlled.

Although this invention has been disclosed and illustrated with reference to particular embodiments, the principles involved are susceptible of numerous other embodiments which will be apparent to persons skilled in the art. The invention is therefore to be limited only as indicated by the scope of the appended claims.

What we claim is:

1. An optoelectronic high precision dimension and displacement measurement device comprising:
    a body;
    a moving sensor stem having displacement to be measured, two guides incorporated in the body along which said stem slides in the body;
    a contact tip at an end of the stem;
    a light source and two adjacent photoreceivers symmetrically positioned on opposite sides of a stem axis;
    a cover carried by the said moving stem having transparent and opaque parts and situated between the source and the photoreceivers whereby movement of the cover in first and second directions has the effect of increasing and reducing respectively the areas of the sensitive surfaces exposed to the light source of the two photoreceivers, said cover being substantially symmetrical with the contact tip of the stem relative to a center point between the two guides; and
    two parallel plates disposed in said body forming a slideway, said plates being at an end of the moving stem other than the contact tip, a slide block sliding in said slideway, said slide block having an oblong transparent portion allowing light to pass from the light source to the photoreceivers and carrying the moving cover.

2. The optoelectronic dimension and displacement measuring device of claim 1 wherein the slide block sliding in the slideway carries the moving cover in a plane perpendicular to the axis of the oblong transparent portion containing an axis of the moving stem.

3. The optoelectronic dimension and displacement measuring device of claim 1 wherein the cover is made up of a rectangular plate including two rectangular windows symmetrically opposite with respect to the center of the plate and two rectangular solid parts symmetrically opposite with respect to said plate center.

4. The optoelectronic dimension and displacement measuring device of claim 1 wherein the two parallel plates forming the slideway are linked by two upper and lower cross-pieces forming a housing into which the sliding block connected to the stem recedes, the light source being mounted on a plate closing off one side of the said housing and the photoreceivers being mounted on a plate closing off the other side of the said housing.

5. The optoelectronic dimension and displacement measuring device of claim 4 further including a spring lodged between the upper cross-piece of the housing and an upper transverse side of the sliding block for biasing the moving stem outside the body.

6. The optoelectronic dimension and displacement measuring device of claim 1 wherein the two parallel plates forming the slideway are contained between two screwed together pieces.

7. The optoelectronic dimension and displacement measuring device of claim 6 wherein the screwed together pieces are half-shells.

8. The optoelectronic dimension and displacement measuring device of claim 7 wherein the body comprises a tube opening into a chamber contained between the two screwed together shells so as to pull the stem up against the bias of the spring.

* * * * *